Herbert P. Silverman
Gino A. Giarrusso
*INVENTORS*

United States Patent Office 3,676,188
Patented July 11, 1972

3,676,188
METHOD FOR PREPARING SENSORS FOR
DETECTING REDUCING VAPORS
Herbert P. Silverman, Orange, and Gino A. Giarrusso,
Long Beach, Calif., assignors to TRW Inc., Redondo
Beach, Calif.
Original application Aug. 23, 1967, Ser. No. 662,688, now
Patent No. 3,549,329, dated Dec. 22, 1970. Divided
and this application Aug. 24, 1970, Ser. No. 66,571
Int. Cl. B44d 1/06, 1/14
U.S. Cl. 117—71 R
2 Claims

ABSTRACT OF THE DISCLOSURE

A thin film of one of the noble metals bonded to a non-corrodible backing and having a reducible metallic salt on at least a portion of the metal film, the salt being adapted to deposit its metal on the metal film when the salt is exposed to reducing vapors.

BACKGROUND OF THE INVENTION

The invention relates to thin film sensors for detecting toxic reducing vapors.

The known prior art is indicated in the following U.S. Letters Patent: Nos.: 2,285,663; 2,881,056; 3,108,242; 3,124,771; and 3,148,348.

This application is a division of copending application Ser. No. 662,688 filed Aug. 23, 1967, now Pat. No. 3,549,329.

SUMMARY OF THE INVENTION

The invention provides a rapid means for detection of toxic reducing vapors found in rocket propellants, such as hydrazine and unsymmetrical dimethyl hydrazine (UDMH). It also provides a method for making such sensing means.

According to the invention, measurement of reducing vapors can be made within a few minutes with a relatively simple, inexpensive, lightweight, highly sensitive and portable sensing instrument. The invention may be in the form of a thin film sensitized badge that can be worn by personnel and the measuring instrument can be carried in a pocket or worn on a belt to effect a portable warning device for personnel working in areas of possible contamination by toxic reducing vapors.

A complete sensor assembly for detecting reducing vapors, according to the invention, may be comprised of a vacuum deposited thin film of one of the noble metals to form a conductive electric pathway on an inert non-conductive substrate. The pathway may be constructed so as to form two legs of a Wheatstone bridge when connected to a suitable instrument. One leg of the film is coated with an inert and impervious coating or tape, such as silicone rubber, vinyl tape or acrylic plastic. The leg to be exposed is sensitized by coating it with an appropriate reducible metallic salt. The legs are connected to the measuring instrument, which is basically a Wheatstone bridge with an amplifier and readout circuits. When a reducing vapor contacts the sensitized leg, the metallic sensitizing salt reacts to form metal which is deposited upon the noble metal film. The deposited metal decreases the resistance of that side of the bridge so as to unbalance the bridge circuit. This unbalance is detected by the instrument and is shown on an ammeter or galvanometer. The amount of unbalance shown is a measure of the amount of the reducing vapor present in the atmosphere.

It has been surprisingly found that a very effective way of sensitizing a noble metal film can be achieved by dipping the inert strip and the metal film bonded thereon into a solution of a volatile organic solvent and a reducible metallic salt having at least one percent by weight of the salt dissolved in the solution; and after removing from the solution, allowing the excess liquid to drain for a few seconds, then flash drying by placing the strip in a stream of hot air having a temperature range of 80° to 130° C., discharged from a heat gun.

Further objects and advantages of the invention may be brought out in the following part of the specification, wherein small details have been described for the completance of disclosure, without intending to limit the scope of the invention which is set forth in the appended claims.

BRIEF DESCRIPTION OF THE DRAWINGS

Referring to the accompanying drawings, which are for illustrative purposes.

DESCRIPTION OF THE PREFERRED EMBODIMENT

Figure 1:
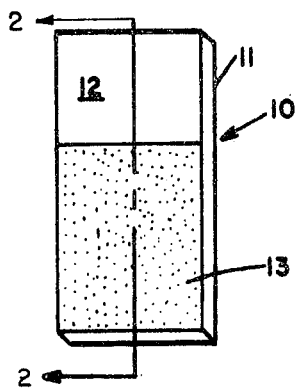
FIG. 1 is an elevational view of the sensitized strip for detecting reducing vapors according to the invention.
Figure 2:
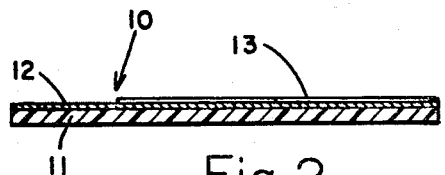
FIG. 2 is a cross-sectional view taken as indicated along the line 2—2 of FIG. 1.

Referring again to the drawings, there is shown in FIGS. 1 and 2 a sensitized strip, generally designated as 10. The strip is comprised of a non-corrodible, substrate portion 11 extending for the full length thereof, a thin film of a noble metal 12 bonded to the part 11 and a sensitized portion 13 of a thin metallic salt layer formed on the noble metal. The substrate portion 11 is insert and non-conductive and has the approximate size of 1½ x 1$\frac{1}{16}$ x $\frac{1}{16}$ inches. The material for the substrate 11 may be, for example, phenolic plastic circuit board material, vinyl resins or polystyrene.

The noble metal film 12 is deposited on the substrate in a vacuum chamber, which is evacuated until there is no longer any significant gassing of the phenolic substrate, for example, and a steady pressure of $10^{-4}$ mm. of mercury is obtained. The noble metal, as silver or gold, used to make the films is evaporated from a tungsten wire filament onto the surfaces of the substrates where they condense to produce the metal films. Any of the more noble metals, such as platinum and rhodium, could also be used. The thickness of the metal film 12 has been varied from 100–10,000 angstrom units. By varying the thickness of metal used in the sensitized strips, a wide range of sensitivity can be acheived.

To apply the reducible metallic sensitizing salt 13 on the metal film 12 the strips were at first either dipped into an aqueous solution of the salt or the aqueous solution was sprayed upon the metal and the thin salt film was permitted to be formed by air drying. However, it was surprisingly discovered that if the strips were dipped into a solution of a volatile organic solvent in which the salt had been dissolved, after which the excess solution was allowed to drain off slowly for about three to five seconds, and then the salt solution was flash dried by placing it in an air stream having a temperature range of from 80° to 130° C. from a heat gun for approximately five seconds, an excellently sensitized strip was formed. The salt layer was very thin and smooth and was tightly secured to the metal film. This method proved to be the most convenient one to use in sensitizing large quantities of films.

The organic solvents used were methanol, ethanol, isopropanol and dioxane. The substitution of the organic solvents, particularly methanol, for water as the solvent resulted in a considerable increase in sensitivity of the salt films. This increase in sensitivity is believed to be due to the formation smaller, more evenly distributed salt crystals on the film.

The following examples illustrate the method for sensitizing noble metals, bonded to 1/16" phenolic plastic circuit board. The thicknesses of the noble metal films were approximately 2,000 angstrom units.

EXAMPLE I

Separate solutions were prepared by dissolving one gram of the following salts in 100 grams of water: potassium gold chloride, tellurium chloride, silver nitrate, silver nitrite-ammonia, and gold iodide with one gram of potassium iodide. Phenolic strips with a gold film bonded thereto were each dipped in one of the solutions or sprayed with one of the solutions and then permitted to dry in the ambient air. Each strip, when dry, had been sensitized with one of the metallic salts.

EXAMPLE II

Five grams of each of the following salts were separately dissolved to prepare a respective salt solution in 100 grams of water: silver nitrate, silver nitrite-ammonia, and gold iodide with five grams of potassium iodide. The phenolic strips, as indicated above, with the gold films were dipped into each of the respective solutions or were sprayed with each of the respective solutions and permitted to dry in the ambient air.

EXAMPLE III

Five grams of silver nitrate were dissolved in 100 grams of methanol. Phenolic strips with gold film bonded thereon were dipped in or sprayed with the 5% silver nitrate solution and then allowed to dry in the ambient air.

EXAMPLE IV

Phenolic strips with a silver metal film bonded thereon, as described above, were dipped in or sprayed with solutions prepared by dissolving one gram of the following salts in 100 grams of water: silver nitrite, silver nitrate and silver acetate. After spraying or removing from the solution each strip was permitted to dry in the ambient air.

EXAMPLE V

Salt solutions were prepared using the above listed salts, dissolving them to prepare one and five percent solutions, as indicated with the respective salts above, in 100 grams of methanol to prepare respective one and five percent solutions. Phenolic strips with gold and silver films bonded thereon were dipped, one in each of the methanol solutions. After removing from the solution, the excess liquid was allowed to drain off slowly for about three to five seconds, and then the salt solution was flash dried on the respective strips in an air stream in a temperature range of between 80° to 130° C. from a heat gun for approximately five seconds.

The strips sensitized in accordance with the foregoing examples were each exposed to hydrazine and unsymmetrical dimethyl hydrazine vapors, the latter vapors being mixed with air for various respective tests in 10, 100, and 1,000 parts per million. Where the toxic vapors were present in air to the extent of 1,000 per million, the flow rate of the gaseous mixture was 0.18 liter per minute and when the toxic gas was present in 10 or 100 parts per million, the gas flow rate was 1.8 liters per minute. The tests were made at 70° F. and at 50% humidity.

Table I shows test results of the various salt sensitizers discussed in the examples above on gold films, exposed in air with 100 parts per million of unsymmetrical dimethyl hydrazine. Referring to the table, a response due to the exposure of the toxic vapor is the change in a metal film caused by contact with the vapor. The response rate is the time rate of change of a metal film caused by the exposure to the toxic vapor and, in Table I, it is expressed as percent resistance change per minute. Resistance change in these tests is a reduction due to the depositing of the metal from the salt on the bonded gold or silver film and it is a change in the electrical or chemical structure of the bonded film, expressed as a percent of the initial resistance. It is seen in Table I that the resistance change of the gold film was substantial; considering the maximum changes, for example, with the potassium gold chloride, there was an 11% change in 10 minutes, with the silver nitrate there was a 12% change in 10 minutes, and with the gold iodide there was a 6% change in 10 minutes.

TABLE I.—RESPONSE OF GOLD FILMS TREATED WITH VARIOUS SENSITIZERS TO 100 P.P.M. UNSYMMETRICAL DIMETHYL HYDRAZINE

| Sensitizer (percent of salt by weight) | Maximum response rate | | Total resistance change | | | |
|---|---|---|---|---|---|---|
| | Time (min.) | Percent change per min. | Time (min.) | Percent | Time (min.) | Percent |
| $KAuCl_4$, 1% aqueous | 5 | 1.4 | 5 | 5.0 | 10 | 11 |
| $TeCl_4$, 1% aqueous | 3 | 0.2 | 5 | 0.2 | 10 | 0.2 |
| $AgNO_3$, 1% aqueous | 1 | 0.9 | 5 | 4.4 | 10 | 5.3 |
| $AgNO_3$, 5% aqueous | 1 | 2.0 | 5 | 6.9 | 10 | 12 |
| $AgNO_2$—$NH_3$, 1% aqueous | 5 | 0.5 | 5 | 1.0 | 10 | 4.0 |
| $AgNO_2$—$NH_3$, 5% aqueous | 16 | 0.7 | 5 | 1.4 | 10 | 2.7 |
| $AuI$, 1% in KI (aqueous) | 7 | 1.2 | 5 | 2.4 | 10 | 6.0 |
| $AuI$, 5% in KI (aqueous) | 4 | 0.5 | 5 | 1.8 | 10 | 4.0 |

Table II shows the test results of silver salts prepared in aqueous solutions, 1% by weight, on silver films when exposed to unsymmetrical dimethyl hydrazine.

TABLE II.—RESPONSE OF METALLIC SILVER–SILVER SALT FILMS TO UNSYMMETRICAL DIMETHYL HYDRAZINE VAPOR

| Salt | UDMH (p.p.m.) | Mean response (percent resistance change per minute) |
|---|---|---|
| $AgNO_2$ | 1,000 | 6.6 |
| $AgNO_3$ | 1,000 | 8.9 |
| $AgNO_2$ | 100 | 6.7 |
| $AgNO_3$ | 100 | 4.3 |
| $AgC_2H_3O_2$ | 100 | 9.0 |
| $AgNO_2$ | 10 | 4.9 |
| $AgNO_3$ | 10 | 1.5 |
| $AgC_2H_3O_2$ | 10 | 6.2 |

Table III shows test results for silver and gold films in which the sensitizers were prepared in a percent by weight solution, as indicated, in methanol and dried by the fast method with a heat gun.

TABLE III

| Salt | Metal film | Gas measured (p.p.m.) | Resistance change per min. response | Sensitizer solvent |
|---|---|---|---|---|
| $AgNO_3$, 1% | Silver | UDMH (100) | 0.6 | Methanol |
| $AgNO_3$, 5% | do | UDMH (100) | 0.5 | Do. |
| $AgNO_3$, 1% | Gold | UDMH (100) | 0.9 | Do. |
| $AgNO_3$, 5% | do | UDMH (100) | 2.0 | Do. |
| $KAuCl_4$, 1% | do | UDMH (100) | 1.4 | Do. |

It was found that the silver salts showed greater effect from aging in clean air, undoubtedly as a result of the silver being more active chemically than gold, for example, and, further, in that the silver salts are photosensitive.

Although the gross changes due to the reduction of the salts by the toxic vapors upon gold films were not as great as those on silver films, the background rates for the gold films in clean air were significantly less than the background rates of silver films; for example, gold films coated with potassium gold chloride, when exposed to normal laboratory air, had a resistance change of 0.1% to 0.2% per hour, but showed an 11% resistance change in 10 minutes when exposed to 100 parts per million of the unsymmetrical dimethyl hydrazine.

Figure 3:
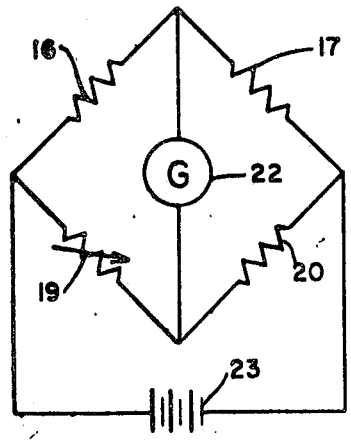
FIG. 3 is a Wheatstone bridge electrical circuit diagram illustrating a means for incorporating a sensitized strip according to the invention into a resistance measuring circuit.

The sensitized strips are adapted for use in systems designed to measure reduction of the salts due to toxic vapors on a continuous basis. In FIG. 3, there is illustrated a system incorporating a Wheatstone bridge circuit. This illustrates when there is a resistance unbalance due to reduction of one of two test elements in a reducing atmosphere. The elements are the same construction but one is treated with a sensitizing salt, as is indicated above, and the other is protected by means of a suitable coating, such as silicone rubber, vinyl tape, acrylic plastic, Scotch cellophane tape and Mystic tape, so that it is not affected by the reducing elements in the air. It was found that Scotch clear cellophane tape is the least permeable to unsymmetrical dimethyl hydrazine.

In the circuit diagram in FIG. 3, a sensitized strip 16 is used as the electrical resistance shown and it is subjected to the reducing atmosphere. The reference resistance 17 contains the same type of metal films as the resistance 16, but it is provided with the coating to prevent a reducing attack on the metal film. The resistances 16 and 17 are disposed in the reducing atmosphere, forming two arms of the bridge circuit which also include a variable resistor 19 and a fixed resistor 20. A potential is applied, as by means of a battery 23 between the opposed legs of the bridge circuit and a sensing device, such as a galvanometer 22, is disposed between the opposite legs of the bridge. When the reduction occurs to the sensitized resistance 16, the decrease in electrical resistance caused by the depositing of the metal salt on the metal film is detected continuously by adjusting the variable resistor 19 until there is no current flow in the galvanometer 22. The variable resistor 19 can be calibrated in regard to reduction to give a continuous indication of the amount of reduction which has occurred.

Figure 4:
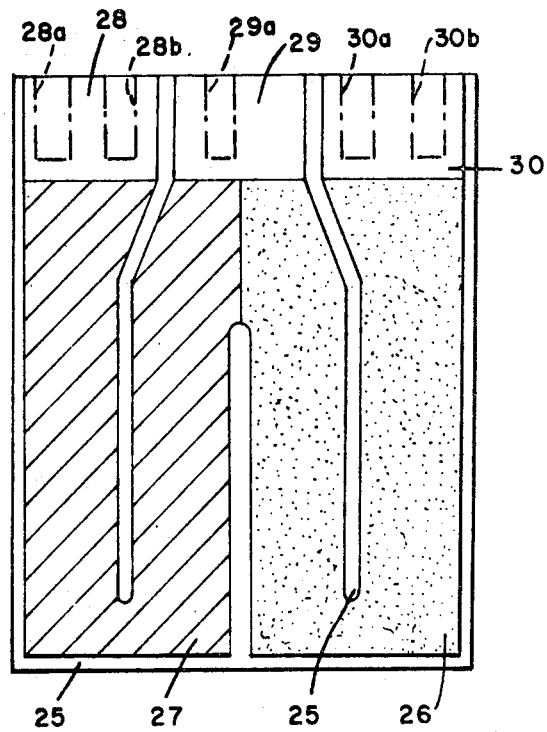
FIG. 4 is a plan view of a sensor according to the invention incorporating the principle of the bridge circuit illustrated in FIG. 3.
Figure 5:
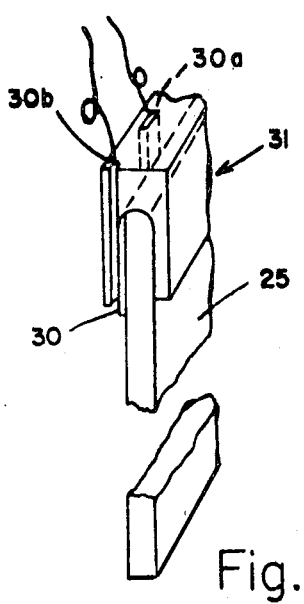
FIG. 5 is a fragmentary perspective view of the sensor of FIG. 4.

In FIGS. 4 and 5, there is illustrated a form of probe which is particularly adapted for use in the type of circuit shown in FIG. 3. A backing 25 composed of a material, such as phenolic plastic, has deposited on it an extremely thin film of one of the noble metals, such as gold or silver. The film is divided into an unprotected sensitized leg 26 and an unsensitized reference leg 27 having a coating of an impervious material, such as Scotch cellophane tape. Electrical connections to the respective legs are provided by copper tabs 28, 29 and 30. A female connector 31 shown in FIG. 5 has metal spring contacts 28a, 28b, 29a, 30a and 30b which are provided for proper attachment to the metering apparatus and completion of the bridge circuit. The contacts fit on the tabs 28, 29, 30 as shown by the phantom lines in FIG. 4 to make the proper connections.

The current carrying tabs 28a and 30b, as shown in FIG. 4, make contact to tabs 28 and 30. For determining the resistance ratio between the reducible leg 26 and the reference leg 27, the contacts 28b, 29a and 30a in the metering circuit are used to compare voltage drops across the two legs to band 27. In order to check the integrity of the reference element, a check element is provided by the area of the leg 27. In making the check, the contacts 28a, 28b and 29a are switched into the metering circuit, and as long as the resistance ratio between the points is constant, there is an assurance that the coating on the reference leg 27 is protecting that element from the reduction action of the toxic vapors. When the sensitized leg is reduced, the resistance is decreased, resulting in the unbalance of the voltage between the two legs.

The invention and its attendant advantages will be understood from the foregoing description and it will be apparent that various changes may be made in the form, construction and arrangement of parts of the invention without departing from the spirit and scope thereof or sacrificing its material advantages, the arrangement hereinbefore described being merely by way of example. We do not wish to be restricted to the specific forms shown or uses mentioned except as defined in the accompanying claims, wherein various portions have been separated for clarity of reading and not for emphasis.

What is claimed is:

1. A method of rendering a metal film sensitive to vapors selected from the group consisting of hydrazine and unsymmetrical dimethyl hydrazine which comprises:
   (a) bonding the film to a backing strip;
   (b) dipping at least a portion of the strip into a volatile organic solvent containing at least 1% of a dissolved salt;
   (c) removing the bonded strip from the salt solution;
   (d) slowly draining the excess solution off the strip; and
   (e) flash drying the film in a hot air stream in a temperature range of 80° C. to 130° C. for approximately five seconds;
      the said film having a thickness varying from about 100–10,000 A. and comprising a metal selected from the group consisting of platinum, rhodium, gold, silver, and tellurium;
      the dissolved salt comprising a salt of the said metal.

2. The method of claim 1 in which the salt is selected from the group consisting of:
   silver nitrate, silver nitrite, silver acetate, potassium gold chloride, tellurium chlorate and gold iodide.

References Cited

UNITED STATES PATENTS

| | | | |
|---|---|---|---|
| 3,148,348 | 9/1964 | Rohrback | 338—13 |
| 2,613,302 | 10/1952 | Gurewitsch | 117—212 |

ALFRED L. LEAVITT, Primary Examiner

C. K. WEIFFENBACH, Assistant Examiner

U.S. Cl. X.R.

117—113, 107, 217; 161—225, 213